US006667797B2

(12) United States Patent
Wang et al.

(10) Patent No.: US 6,667,797 B2
(45) Date of Patent: Dec. 23, 2003

(54) PHASE RETARDATION ANTI-COUNTERFEIT METHOD

(75) Inventors: Nai-Yueh Wang, Ma-Kung (TW); Chao-Hsu Tsai, Hsinchu (TW)

(73) Assignee: Industrial Technology Research Institute, Hsin-Chu Hsien (TW)

( * ) Notice: Subject to any disclaimer, the term of this patent is extended or adjusted under 35 U.S.C. 154(b) by 0 days.

(21) Appl. No.: 10/226,144

(22) Filed: Aug. 23, 2002

(65) Prior Publication Data

US 2003/0179363 A1 Sep. 25, 2003

(30) Foreign Application Priority Data

Mar. 19, 2002 (TW) ...................................... 91105121 A

(51) Int. Cl.[7] .......................... G06K 9/74; B42D 15/00
(52) U.S. Cl. ........................................... 356/71; 283/90
(58) Field of Search .......................... 356/71, 364, 369, 356/370; 283/87, 90, 91

(56) References Cited

U.S. PATENT DOCUMENTS 3,313,941 A * 4/1967 Makrs ........................ 250/566
3,391,479 A * 7/1968 Buzzell et al. ................ 283/90
3,610,120 A * 10/1971 Morse et al. ............... 396/332
3,827,726 A * 8/1974 McVoy et al. ................ 283/75
4,175,775 A * 11/1979 Kruegle ........................ 283/88
4,659,112 A * 4/1987 Reiner et al. ................. 283/90
5,284,364 A * 2/1994 Jain ............................ 283/87
6,570,648 B1 * 5/2003 Muller-Rees et al. ......... 356/71

* cited by examiner

*Primary Examiner*—Michael P. Stafira
(74) *Attorney, Agent, or Firm*—Bacon & Thomas, PLLC

(57) ABSTRACT

The anti-counterfeit method of the invention conceals an authentication pattern in a retarder by means of specific treatments that achieve different phase retardation on the retarder. To authenticate the authentication pattern, the invention provides an identification system that can produce and filter polarized light projected through the retarder to display the authentication pattern. To improve protection against counterfeits, the invention further conceals the authentication pattern in a plurality of retarders that must be assembled with one another to display the authentication pattern. One retarder carrying a part of the authentication pattern and the polarizer can be therefore incorporated within the identification system to achieve a more effective anti-counterfeit effect.

28 Claims, 8 Drawing Sheets

| | Type | Phase retardation of retarder | | Transmittance | |
|---|---|---|---|---|---|
| | | Concealed pattern region | Background region | Concealed pattern region | Background region |
| 1 | Upper polarizer : horizontally linear polarizer<br>Lower polarizer : vertically linear polarizer | 1/2 λ | 0 λ | 100% | 0% |
| | | 0 λ | 1/2 λ | 0% | 100% |
| 2 | Upper polarizer : vertically linear polarizer<br>Lower polarizer : horizontally linear polarizer | 1/2 λ | 0 λ | 100% | 0% |
| | | 0 λ | 1/2 λ | 0% | 100% |
| 3 | Upper polarizer : vertically linear polarizer<br>Lower polarizer : vertically linear polarizer | 1/2 λ | 0 λ | 0% | 100% |
| | | 0 λ | 1/2 λ | 100% | 0% |
| 4 | Upper polarizer : horizontally linear polarizer<br>Lower polarizer : horizontally linear polarizer | 1/2 λ | 0 λ | 0% | 100% |
| | | 0 λ | 1/2 λ | 100% | 0% |

(1) 0% means the polarized light is absorbed by the polarizer.
(2) 100% means the polarized light passes through the polarizer thoroughly.

FIG.9

PHASE RETARDATION ANTI-COUNTERFEIT METHOD

FIELD OF THE INVENTION

The invention relates to an anti-counterfeit method that can protect confidential documents or sales articles against counterfeit. More particularly, the invention provides a method that can conceal the authentication mark of the article in such a manner that it is visible only with the use of a specific identification system.

BACKGROUND OF THE INVENTION

Along with the technical progress in various fields such as mechanical processing, electro-forming, scanning techniques, or printing techniques, effective anti-counterfeit measures have to be continuously improved.

Presently, commonly used anti-counterfeit methods are based on the use of a transparent protecting film that covers laser holographic layers or laser anti-counterfeit structures of diffraction optical grating that are attached on the article to conceal an authentication pattern. Concealed by means of the laser holographic layers or laser anti-counterfeit structures of diffraction optical grating, the authentication pattern however can be displayed via light projection thereon. Moreover, a counterfeiter can remove the transparent protecting film easily and copy the authentication pattern concealed in the laser holographic layers or laser anti-counterfeit structures of diffraction optical grating by electro-forming. In addition, the counterfeiter can desirably produce a falsification to replace the authentic laser label, but common people are usually incapable of distinguishing this falsification without a comparison with the authentic label. Furthermore, as printing techniques and digital acquisition techniques progress, accurate printing anti-counterfeit patterns can be also easily reproduced through high resolution scanning and printing to obtain a falsified version hardly discernable.

Another method known in the prior art is the use of two optical gratings or two holographic layers among which one is an authentication element. The authentication pattern becomes visible only once the authentication optical grating or holographic element is properly superposed over the other optical grating or holographic layer. Such a method thus favorably allows the user to easily authenticate an article. However, the fabrication of holographic elements or optical gratings is difficult to achieve and not economical.

SUMMARY OF THE INVENTION

It is therefore an object of the invention to provide an anti-counterfeit method that overcomes the above problems by concealing the authentication pattern in a manner not to be directly visible, and that is difficult to falsify.

To achieve the above and other objectives, the anti-counterfeit method of the invention conceals an authentication pattern in a retarder where the authentication pattern is incorporated in a concealed pattern region and a background region of different phase retardation. To authenticate the authentication pattern, the invention further provides an identification system in which the patterned retarder and one or more polarizers are to be assembled. The identification system polarizes the light that passes through the retarder and produces different transmittances of the concealed pattern region and background region, and thereby displays the authentication pattern. To improve protection against counterfeits, the invention further conceals the authentication pattern in a plurality of retarders that must be assembled with one another to display the authentication pattern. The retarder carrying a part of the authentication pattern with the polarizers can therefore assembled within the identification system to achieve a more effective anti-counterfeit measure.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows:

FIG. 9 is a table showing different transmittances of the concealed pattern region and background region obtained for various configurations of the retarders once assembled with the transmissive type identification system according to the invention;

DETAILED DESCRIPTION OF THE EMBODIMENTS

Figure 1:
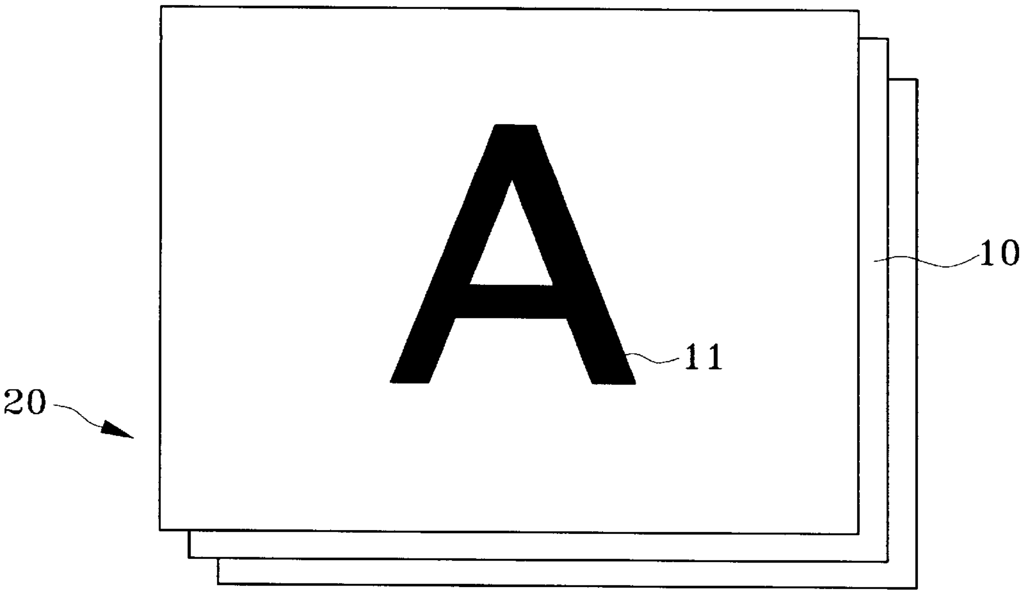
FIG. 1 is a schematic view illustrating a phase retardation anti-counterfeit method according to an embodiment of the invention.

Wherever possible in the following description, like reference numerals will refer to like elements and parts unless otherwise illustrated.

Figure 2:
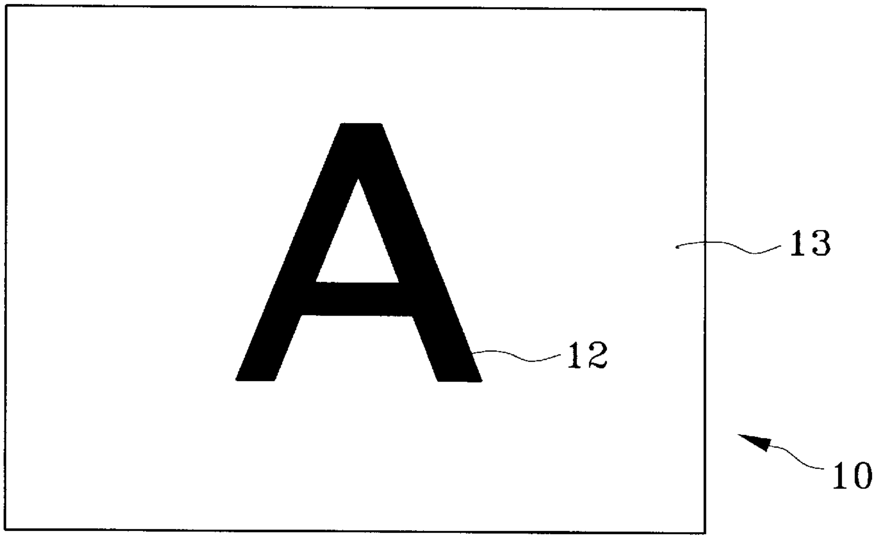
FIG. 2 is a schematic view of a retarder according to an embodiment of the invention.

FIG. 1 is a schematic view of a phase retardation anti-counterfeit method according to an embodiment of the invention. In accordance with the invention, the phase retardation anti-counterfeit method provides a retarder 10 that has an authentication pattern 11 incorporated in the retarder 10 in a concealed pattern region 12 and a background region 13, as shown in FIG. 2. By combining the retarder 10 with the identification system 20 that can generate and filter polarized light, and the different transmittances from the concealed pattern region 12 and the background region 13 will show the authentication pattern 11. The authentication pattern 11 hence can be authenticated via human eyes or specific authentication machines.

In FIG. 1 and FIG. 2, the concealed pattern region 12 and the background region 13 are formed by means of specific treatments (such as the chemical treatments or thermal treatments to either partially or entirely elimate the phase retardation in the processing regions) applied on the phase retardation regions of the retarder 10. Before assembling with the identification system 20, the concealed pattern region 12 and the background region 13 are both transparent. Therefore, it is impossible for an observer to directly see the authentication pattern 11 of the retarder 10. Even by using an ordinary light source projected on the retarder 10, the observer cannot read the authentication pattern 11. Anti-counterfeit is therefore effectively achieved.

Figure 3:
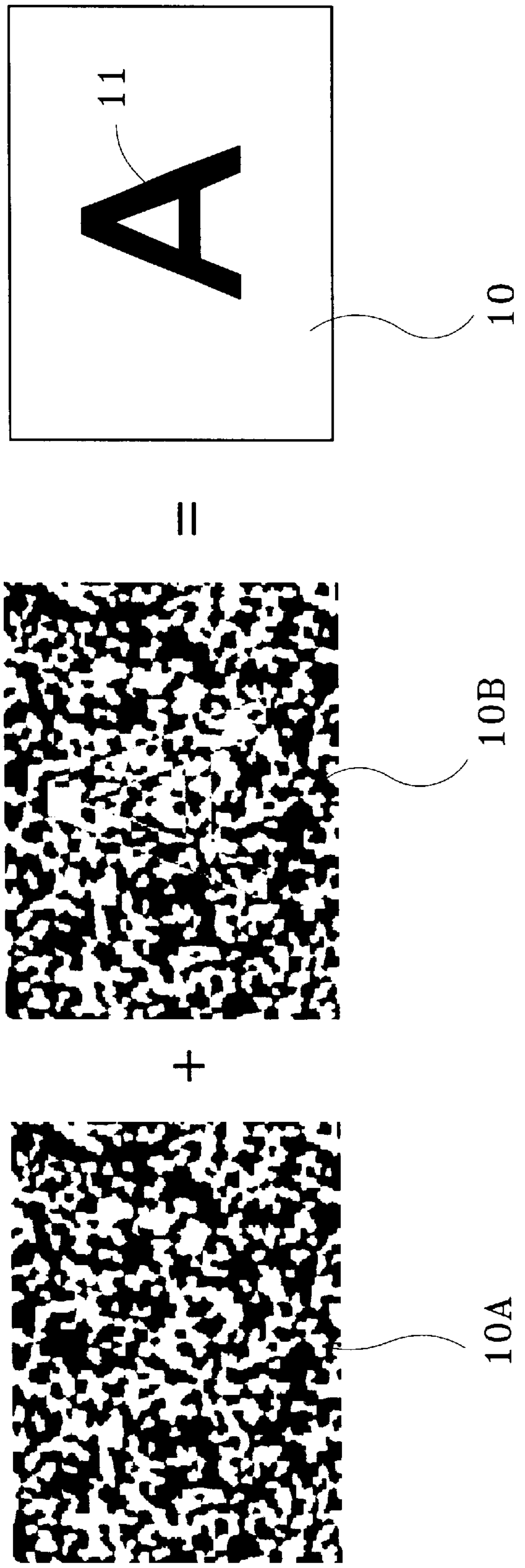
FIG. 3 is a schematic view illustrating a phase retardation anti-counterfeit method using two retarders according to an embodiment of the invention.
Figure 4:
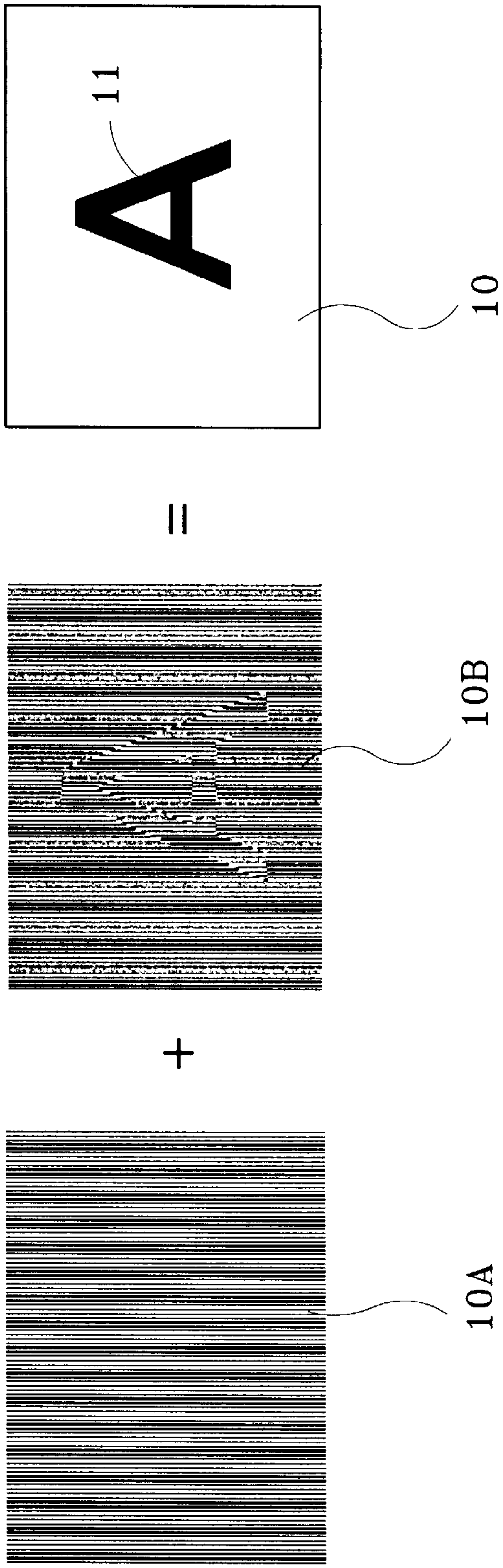
FIG. 4 is a schematic view of a stripe-patterned retarder according to an embodiment of the invention.

As described above, the authentication pattern 11 is incorporated in at least one retarder 10. As shown in FIG. 3, the invention also envisages a retarder 10 that is formed via the lamination of a first retarder 10A and a second retarder 10B. Hence, the phase retardation of each retardation region on the retarder 10 is the result of accumulating phase retardation in the corresponding position on the first retarder 10A and the second retarder 10B. The authentication pattern 11 can be thereby dispersed on two or more different retarders (such as the first retarder 10A and the second retarder 10B). Hence, one retarder (for example first retarder 10A) may be disposed on the article to be protected while the other retarder (for example second retarder 10B) is disposed on the identification system 20. Hence, the authentication pattern 11 appears only when both retarders are properly superposed over each other. Therefore, if a counterfeiter tries to access to the authentication pattern 11 from the article, only an incomplete part of the authentication pattern 11 may be unveiled since the other part lies on the identification system 20. Counterfeit of the authentication pattern thus is prevented. In addition, the authentication pattern 11 of the first retarder 10A and the second retarder 10B may be further concealed in random-dot pattern (FIG. 3) or stripe pattern (FIG. 4) so that the distinction of the authentication pattern 11 through visual perception, before assembling with the identification system 20, is even more difficult. Besides the binary retardation processing (the processed regions having zero retardation), the production of the random-dot pattern may be also generated in gray-scale and the retarder may be processed in a gray-scale retardation processing manner accordingly. With respect to stripe pattern, the stripe directions can be achieved according to a random-period irregular manner. When random-dot pattern is used to conceal the authentication pattern 11, a counterfeiter that obtains one of the retarders 10A, 10B can only see random dots and cannot distinguish the corresponding part of the authentication pattern 11. The random-dot pattern and the stripe pattern therefore contribute to increase the efficiency of the anti-counterfeit effect.

Figure 5:
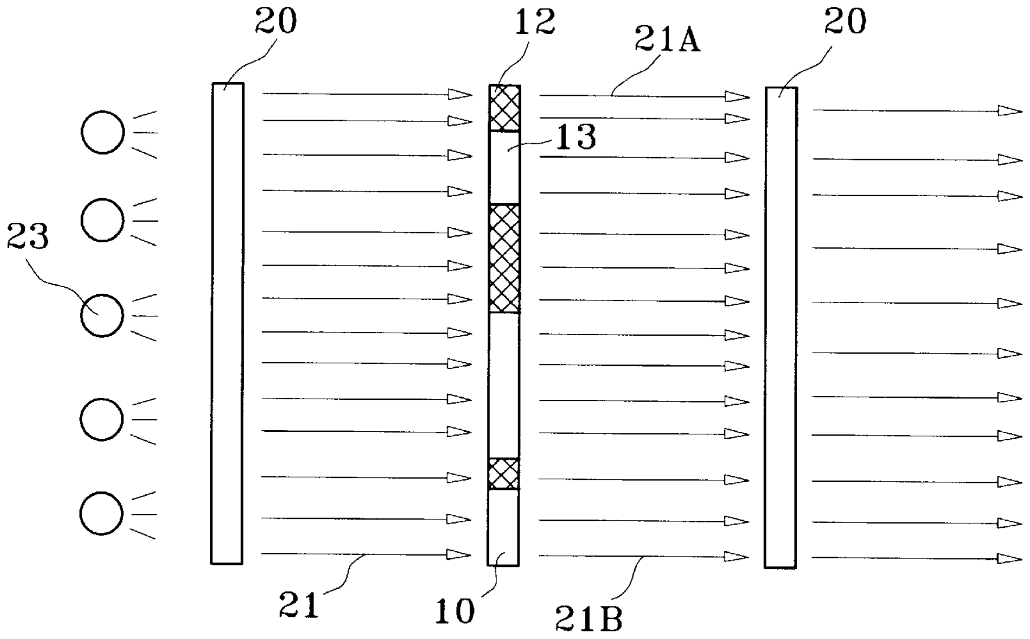
FIG. 5 is a schematic view illustrating the assembly of the retarder with the identification system according to an embodiment of the invention.

FIG. 5 is a schematic view illustrating the assembly of the identification system 20 with the retarder 10 according to an embodiment of the invention. The polarized light 21 of the identification system 20 is projected on the retarder 10, and travels through the concealed pattern region 12 and the background region 13 of different phase retardation. The First and the second polarized lights 21A, 21B of different polarization directions respectively come out from the concealed pattern region 12 and the background region 13, and travel through the identification system 20 to produce different transmittances of the concealed pattern region 12 and background region 13. The authentication pattern 11 is thereby displayed.

Depending on whether the article protected by the anti-counterfeit method of the invention is transparent or not, the identification system 20 of the invention may be either of transmissive or reflective type as described hereafter.

Transmissive Type Identification System

Figure 6:
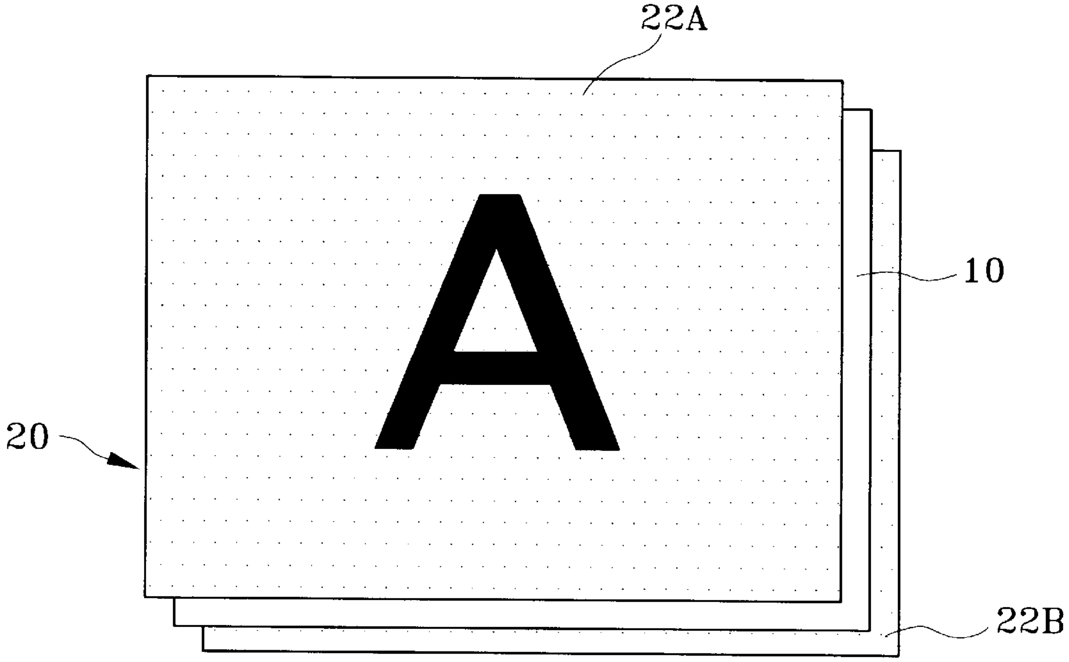
FIG. 6 is a schematic view illustrating the assembly of a transmissive type identification system with a single retarder according to an embodiment of the invention.

As shown in FIG. 6, a transmissive type identification system 20A according to an embodiment of the invention comprises an upper polarizer 22A and a lower polarizer 22B that are respectively placed above and below the retarder 10. The upper and lower polarizers 22A, 22B may be, for example, linear polarizers, elliptical polarizers, or circular polarizers. In addition, the upper polarizer 22A and the lower polarizer 22B may be further assembled with other elements into integrated optical modules (not shown). As illustrated in the schematic view of FIG. 7, once the transmissive type identification system 20A is assembled with the retarder 10, a polarized light 21 is generated via light projection from a light source 23 through the lower polarizer 22B. The polarized light 21 travels through the concealed pattern region 12 and background region 13 of the retarder 10 with different phase retardation, thereby generating the first and the second polarized lights 21A, 21B of different polarization directions that then travel through the upper polarizer 22A. Due to the polarization characteristic of the upper polarizer 22A, the polarized lights 21A, 21B while penetrating there through are also subjected to absorption that results in different transmittances with respect to the concealed pattern region 12 and the background region 13. Via the contrast of the above different transmittances, the authentication pattern 11 is thereby displayed. The higher the contrast of the concealed pattern region 12 and the background region 13, the clearer the display of the authentication pattern 11. The authentication pattern 11 may be also displayed via light projection inversely from the light source 23 on the upper polarizer 22A, through the retarder 10 to the lower polarizer 22B.

As shown in FIG. 6, the upper and lower polarizers 22A, 22B respectively can be, for example, horizontally linear and vertically linear polarizers, and the retarder 10 is a ½λ(half wavelength) retarder. By means of specific treatments (such as chemical treatments, thermal treatments, or laser treatments), the phase retardation of the concealed pattern region 12 hence is set to ½λ while the phase retardation of the background region 13 is set to 0. Meanwhile, the lower polarizer 22B is a vertical linear polarizer, and the stretching direction of the retarder 10 is adjusted to tilt 45° from the polarized direction of the lower polarizer 22B. Hence, the vertically polarized light, generated via light projection through the lower polarizer 22B, respectively becomes horizontally polarized after traveling through the concealed pattern region 12 of the retarder 10 and remains unchanged after traveling through the background region 13. The horizontally polarized light from the concealed pattern region 12 then passes through the horizontal direction upper polarizer 22A, so that the concealed pattern region 12 is entirely transparent. Meanwhile, the vertically polarized light is absorbed by the upper polarizer 22A, so that the background region 13 appears to be black.

Because contrast between the concealed pattern region 12 (entirely transparent) and the background region 13 (black color) is highest consequently, the authentication pattern 11 is therefore clearly displayed. FIG. 9 is a table illustrating various transmittances of the concealed pattern region 12 and background region 13 obtained with different phase retardation in combination with polarizers of different polarization directions.

Figure 8:
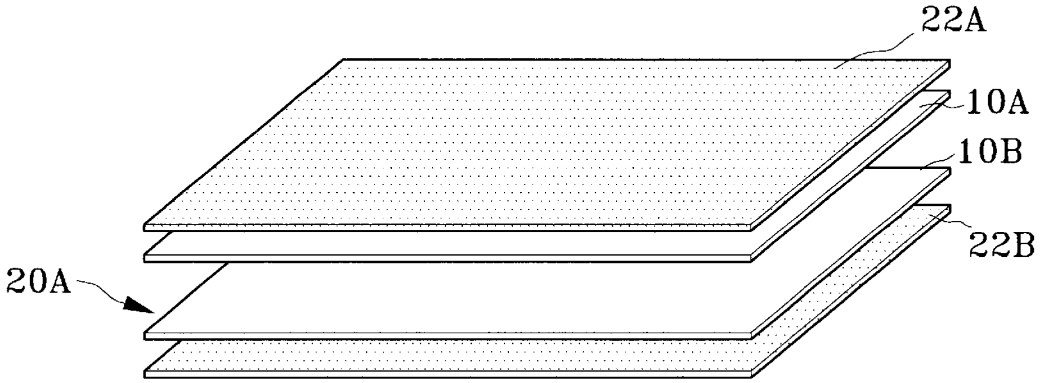
FIG. 8 is a schematic view illustrating the assembly of the transmissive type identification system with two retarders according to an embodiment of the invention.

As shown in FIG. 8, the transmissive type identification system 20A can also accommodate the use of two retarders. The first retarder 10A can be attached to one polarizer, for example the upper polarizer 22A, while the second retarder 10B is attached to the other polarizer, for example the lower polarizer 22B. Provided with the first retarder 10A thereon, the upper polarizer 22A then is attached to a transparent article to be protected against counterfeit, thereby a part of the authentication pattern 11 is concealed on the article. The other part of the authentication pattern 11 is in turn concealed in the transmissive type identification system 20A. Hence arranged, the authentication pattern 11 is visible only once the first retarder 10A and the second retarder 10B are properly superposed over each other and light is projected from the light source 23 through the lower polarizer 22B. Counterfeit is therefore more difficult since the unique possession of the transparent article or the transmissive type identification system 20A is insufficient to obtain the authentication pattern 11.

Figure 7:
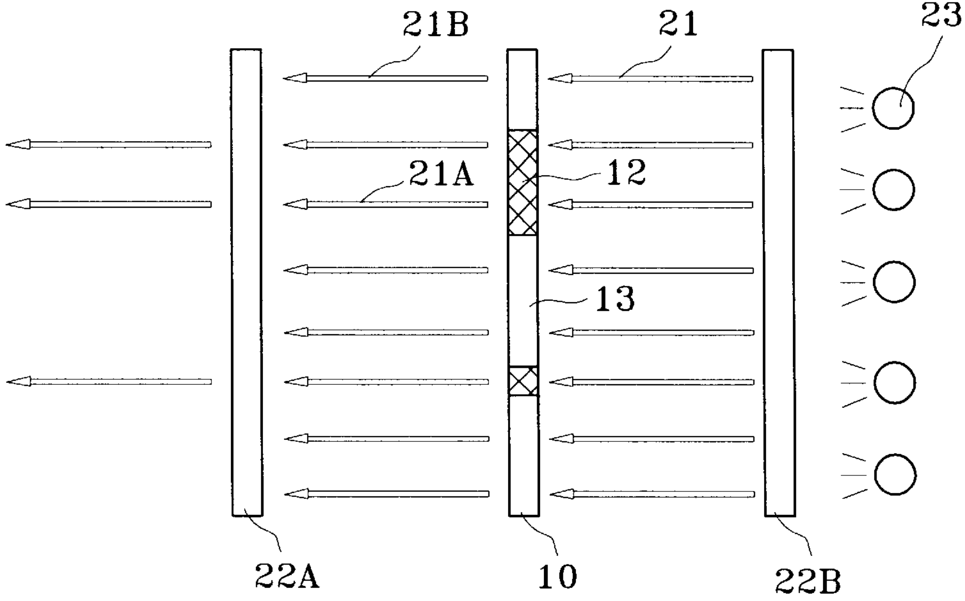
FIG. 7 is a schematic view illustrating the light travels through the transmissive type identification system and the single retarder according to an embodiment of the invention.
Figure 10:
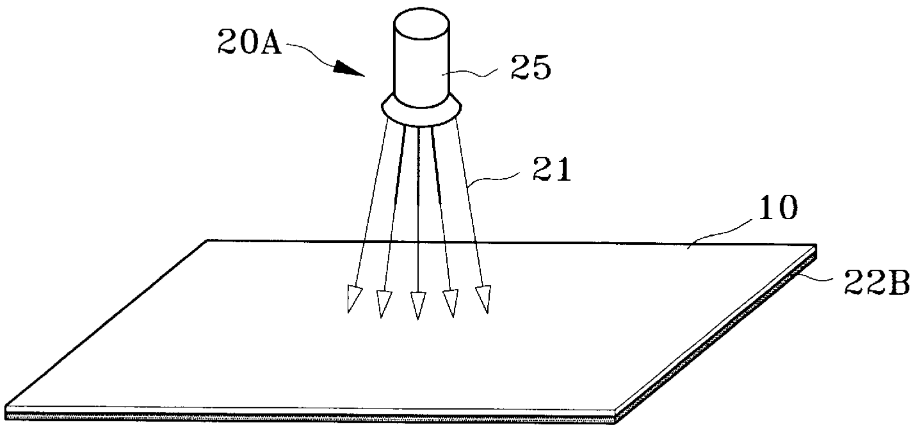
FIG. 10 is a schematic view of a transmissive type identification system according to another embodiment of the invention.

According to a variant example, the transmissive type identification system 20A can be equipped with a polarized light emitter as substitution for the light source 23 and the lower polarizer 22B of FIG. 7. As illustrated in FIG. 10, the transmissive type identification system 20A hence comprises a polarized light emitter 25 and a lower polarizer 22B placed below the retarder 10. Once the retarder 10 is assembled with the transmissive type identification system 20A, the polarized light emitter 25 projects a polarized light on the upper surface of the retarder 10, thereby displaying the authentication pattern. With the retarder 10 attached thereto, the lower polarizer 22B can be further attached to an article to conceal the authentication pattern 11 thereon.

Reflective Type Identification System

Figure 11:
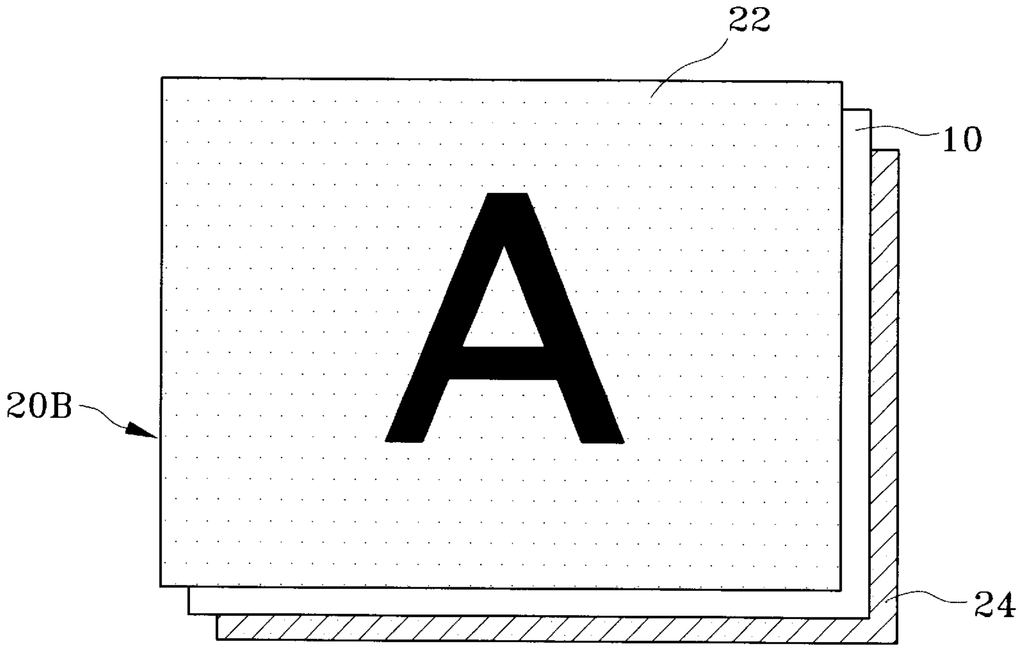
FIG. 11 is a schematic view illustrating the assembly of a reflective-type identification system with a single retarder according to an embodiment of the invention.

As schematically shown in FIG. 11, a reflective type identification system 20B comprises a polarizer 22 disposed above the retarder 10 and a polarization reserved reflective layer 24. The polarizer 22 can be, for example, a linear polarizer, an elliptical polarizer or a circular polarizer, while the reflective layer 24 can be, for example, metallic. In addition, the polarizer 22 and the reflective layer 24 may be possibly assembled with other elements into integrated optical modules (not shown). Once the reflective type identification system 20B is assembled with the retarder 10, a polarized light 21 is generated via light projection from the light source 23 through the polarizer 22. The polarized light 21 travels through the concealed pattern region 12 and the background region 13 of the retarder 10 with different phase retardation, and becomes polarized light of different polarization directions that reflect from the reflective layer 24. After reflection from the reflective layer 24, the polarized light travel again through the concealed pattern region 12 and the background region 13, thereafter generating the first polarized light 21A and the second polarized light 21B that arrives on the polarizer 22. Due to the polarization characteristic of the polarizer 22, the first and second polarized lights 21A, 21B while penetrating there through are also subjected to absorption that generates different reflectivity with respect to the concealed pattern region 12 and the background region 13. Via the contrast of the above different reflectivity, the authentication pattern 11 is thereby displayed. The higher the contrast of the concealed pattern region 12 and the background region 13, the clearer the display of the authentication pattern 11.

As schematically shown in FIG. 11, the polarizer 22 can be, for example, a horizontally linear polarizer and the retarder 10 a ¼λ retarder. By means of specific treatments (such as chemical treatments, thermal treatments, or laser treatments), the phase retardation of the concealed pattern region 12 hence is set to ¼λ. while the phase retardation of the background region 13 is set to 0. Meanwhile, the polarizer 22 is adjusted in a manner to have the polarization direction thereof forming 45° with the stretching direction of the retarder 10. Hence, the horizontally polarized light, generated via light projection through the polarizer 22, respectively becomes circularly polarized after traveling through the concealed pattern region 12 and remains unchanged after traveling through the background region 13. The circularly polarized light from the concealed pattern region 12 then reflects from the polarization reserved reflective layer 24 toward the concealed pattern region 12 of ¼λ phase retardation after which it becomes vertically polarized. As a result, the concealed pattern region 12 appears in black color. Meanwhile, the horizontally polarized light from the background region 13, after reflection from the reflective layer 24, passes through the background region 13 again and remains horizontally polarized. The background region 13 is consequently completely transparent. Because the hue of the concealed pattern region 12 (black color) and the background region 13 (reflective) then has the highest contrast, the authentication pattern 11 is therefore clearly displayed.

Figure 12:
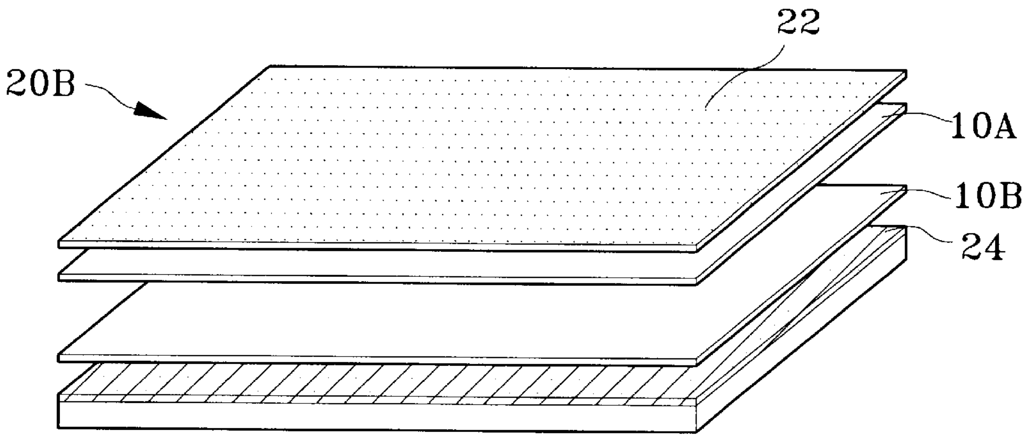
FIG. 12 is a schematic view of the assembly of the reflective-type identification system with two retarders according to an embodiment of the invention.

As shown in FIG. 12, the reflective type identification system 20B can also accommodate the use of two retarders. The first retarder 10A can be attached to one polarizer 22, while the second retarder 10B is attached to the reflective layer 24. Provided with the second retarder 10B thereon, the reflective layer 24 then is attached to a non-transparent article to be protected against counterfeit, thereby a part of the authentication pattern 11 is concealed on the article. The other part of the authentication pattern 11 is in turn concealed in the reflective type identification system 20B. Hence arranged, the authentication pattern 11 is visible only once the first retarder 10A and the second retarder 10B are properly superposed over each other and light is projected from the light source 23 through the polarizer 22. Counterfeit is therefore more difficult since only possessing the non-transparent article or reflective type identification system 20B is insufficient to obtain the authentication pattern 11.

According to another example schematically illustrated in FIG. 13, the reflective type identification system 20B may alternatively comprise a polarized light emitter 25 and a reflective polarizer 26 disposed below the retarder 10. The reflective polarizer 26 is a polarizer with a reflective layer that only reflects the light of a specific polarization direction, and the light of other polarization directions either are absorbed or passes there through. Once the retarder 10 is assembled with the reflective type identification system 20B, the polarized light emitter 25 projects a polarized light through the upper surface of the retarder 10 to the reflective polarizer 26. The polarized light that reaches the reflective polarizer 26 with a polarization direction similar to that of the reflective polarizer 26 is reflected while the light of other polarization directions either is absorbed or passes there through. Because the concealed pattern region 12 and the background region 13 have different phase retardation, the polarized light that respectively passes there through becomes polarized light of different polarization directions. As a result, the light that reaches the reflective polarizer 26 reflects differently with different reflectivities, thereby causing the authentication pattern to be displayed. Hence, with the retarder 10 attached thereto, the reflective polarizer 26 can be further attached to an article to conceal the authentication pattern thereon.

Figure 13:
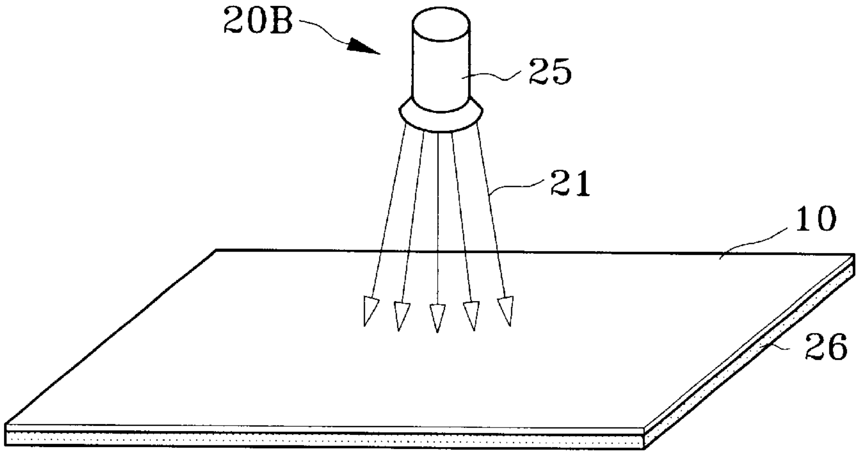
FIG. 13 is a schematic view of a reflective-type identification system according another embodiment of the invention.

In another example of reflective type identification system illustrated in FIG. 13, the general phase retardation of the retarder 10 is ½λ, the phase retardation of the concealed pattern region 12 is ½λ and the phase retardation of the background region 13 is consequently 0. Furthermore, if the direction of the polarized light from the polarized light emitter 25 is horizontal, the polarization direction of the reflective polarizer 26 is also horizontal. The polarization direction of the reflective polarizer 26 and the stretching direction of the retarder 10 are set to form 45°. With the above disposition, once the horizontally polarized light is projected from the polarized light emitter 25 through the retarder 10, the resulting light passes through the concealed pattern region 12 is vertically polarized while that passes through the background region 13 remains horizontally polarized. Once the above two polarized lights reach the reflective polarizer 26, the vertically polarized light passes through the concealed pattern region 12 is either entirely absorbed or entirely passes through the reflective polarizer 26: an observer then sees a corresponding black region. Meanwhile, the horizontally polarized light passes through the background region 13 is entirely reflected via the reflective polarizer 26: an observer then sees a reflective region. By means of the above disposition, a maximum contrast is favorably obtained.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A phase retardation anti-counterfeit method, comprising:

providing a retarder, incorporating a authentication pattern concealed in a concealed pattern region and a background region thereof with respective different phase retardations;

providing an identification system, capable of generating polarized light; and assembling the retarder with the identification system and projecting the polarized light through the retarder to produce different transmittances of the concealed pattern region and the background region so that the authentication pattern is displayed to be authenticated.

2. The method of claim 1, wherein the concealed pattern region and the background region are transparent before the retarder is assembled with the identification system, and the displayed authentication pattern when the retarder is assembled with the identification system is authenticable via human eyes or machine authentication.

3. The method of claim 1, wherein the incident polarized light projected through the retarder generates a first polarized light and a second polarized light of different polarization directions respectively after the concealed pattern region and the background region.

4. The method of claim 1, wherein a part of the authentication pattern is concealed on at least another retarder.

5. The method of claim 1, wherein the retarder is formed via the lamination of at least a first retarder and a second retarder, the phase retardation of each region on the retarder being the accumulation of the phase retardation of the corresponding regions of the first and second retarders.

6. The method of claim 5, wherein the authentication pattern is incorporated in the first and the second retarders in a random-dot pattern manner.

7. The method of claim 5, wherein the authentication pattern is incorporated in the first and second retarders in a stripe pattern manner.

8. The method of claim 1, wherein the identification system includes a pair of polarizers that are respectively placed above and below the retarder.

9. The method of claim 8, wherein once the identification system is assembled with the retarder, the light is projected on one of the pair of polarizers to display the authentication pattern.

10. The method of claim 8, wherein the retarder is a ½λ retarder, and through specific treatments the concealed pattern region and the background region have respective phase retardation of either ½λ and 0λ, or 0λ and ½λ.

11. The method of claim 8, wherein the polarizers of the identification system are linear polarizers, elliptical polarizers, or circular polarizers.

12. The method of claim 8, wherein the first retarder is attached to one of the pair of polarizers while the second retarder is attached to the other polarizer, the first retarder and the corresponding polarizer being attached to an article to be protected against counterfeit to conceal the authentication pattern thereon.

13. The method of claim 12, wherein once the first and second retarders attached to their corresponding polarizers are properly superposed over each other, a light projected on one of the polarizers causes the authentication pattern to be displayed on the other polarizer.

14. The method of claim 1, wherein the identification system includes a polarizer disposed above the retarder and a polarization reserved reflective layer disposed below the retarder.

15. The method of claim 14, wherein once the identification system is assembled with the retarder, a light projected on the polarizer travels through the retarder and reflects on the reflective layer to display the authentication pattern.

16. The method of claim 14, wherein the retarder is a ¼λ retarder, and through specific treatments, the respective phase retardation of the concealed pattern region and the background region are either ¼λ and 0λ or 0λ and ¼λ.

17. The method of claim 14, wherein the polarizer of the identification system is a linear polarizer, an elliptical polarizer, or a circular polarizer.

18. The method of claim 14, wherein the first retarder is attached to the polarizer, and the second retarder is attached to the reflective layer, the reflective layer being attached to a non-transparent article to be protected against counterfeit, thereby concealing the authentication pattern on the non-transparent article.

19. The method of claim 18, wherein once the first and second retarders are properly superposed over each other, the light projected through the polarizer causes the authentication pattern to be displayed.

20. The method of claim 1, wherein the identification system further includes a polarized light emitter and a lower polarizer disposed below the retarder.

21. The method of claim 20, wherein once the identification system and the retarder are assembled with each other, the polarized light emitter projects polarized light on an upper surface of the retarder to display the authentication pattern.

22. The method of claim 20, wherein once a first surface of the lower polarizer is attached to the retarder there below, a second surface of the lower polarizer is further attached to a transparent article to be protected against counterfeit, thereby concealing the authentication pattern thereon.

23. The method of claim 20, wherein the retarder is a ½λ retarder, and through specific treatments, the respective phase retardations of the concealed pattern region and the background region are either ½λ and 0λ or 0λ and ½λ.

24. The method of claim 1, wherein the identification system includes a polarized light emitter and a reflective polarizer that is disposed below the retarder.

25. The method of claim 24, wherein once the identification system and the retarder are assembled with each other, the polarized light emitter projects polarized light on an upper surface of the retarder to display the authentication pattern.

26. The method of claim 24, wherein once a first surface of the reflective polarizer is attached to the retarder there below, a second surface of the reflective polarizer is further attached to a transparent article to be protected against counterfeit, thereby concealing the authentication pattern on the transparent article.

27. The method of claim 24, wherein the reflective polarizer includes a polarizer and a reflective layer disposed below the polarizer to produce a reflected polarized light.

28. The method of claim 24, wherein the retarder is a ½λ retarder, and through specific treatments, the respective phase retardations of the concealed pattern region and the background region are either ½λ and 0λ or 0λ and ½λ.

* * * * *